(12) United States Patent
Drinkwater et al.

(10) Patent No.: US 6,712,399 B1
(45) Date of Patent: Mar. 30, 2004

(54) SECURITY DEVICE

(75) Inventors: Kenneth John Drinkwater, Surrey (GB); Marianne Michelle Anton, Hants (GB); Ralph Kay, Hampshire (GB)

(73) Assignee: De la Rue International Limited (GB)

( * ) Notice: Subject to any disclaimer, the term of this patent is extended or adjusted under 35 U.S.C. 154(b) by 121 days.

(21) Appl. No.: 10/031,238

(22) PCT Filed: Jul. 7, 2000

(86) PCT No.: PCT/GB00/02618
§ 371 (c)(1),
(2), (4) Date: Jan. 17, 2002

(87) PCT Pub. No.: WO01/07268
PCT Pub. Date: Feb. 1, 2001

(30) Foreign Application Priority Data

Jul. 23, 1999 (GB) .............................................. 9917442

(51) Int. Cl.⁷ .............................................. B42D 15/00
(52) U.S. Cl. ........................... 283/111; 283/72; 283/81; 283/101; 283/904; 359/2; 428/915; 428/916
(58) Field of Search ................ 283/81, 72, 82, 283/84, 86, 91, 92, 94, 101, 111, 107, 108, 110, 904; 359/2; 428/915, 916

(56) References Cited

U.S. PATENT DOCUMENTS

| | | | | |
|---|---|---|---|---|
| 5,310,222 A | * | 5/1994 | Chatwin et al. | 283/86 |
| 5,483,363 A | * | 1/1996 | Holmes et al. | 359/2 |
| 5,492,370 A | * | 2/1996 | Chatwin et al. | 283/110 |
| 5,712,731 A | * | 1/1998 | Drinkwater et al. | 359/619 |
| 5,974,150 A | * | 10/1999 | Kaish et al. | 713/179 |
| 6,089,614 A | * | 7/2000 | Howland et al. | 283/91 |
| 6,369,919 B1 | * | 4/2002 | Drinkwater et al. | 359/2 |

FOREIGN PATENT DOCUMENTS

| | | |
|---|---|---|
| EP | 0 253 089 A1 | 1/1988 |
| WO | WO 94/11203 | 5/1994 |

* cited by examiner

*Primary Examiner*—Monica S. Carter
(74) *Attorney, Agent, or Firm*—Oliff & Berridge, PLC

(57) ABSTRACT

A security device comprises an optically variable effect generating structure (3,4). An obscuring layer (7) is located, in use, between the optically variable effect generating structure and a substrate (8) to which the device is secured. A color layer (6) is also included which exhibits one or more predetermined colors when viewed under certain viewing conditions from the side of the device remote from the obscuring layer. The obscuring layer (7) is substantially opaque under the said certain viewing conditions.

23 Claims, 1 Drawing Sheet

SECURITY DEVICE

BACKGROUND OF THE INVENTION

1. Field of the Invention

The invention relates to a security device for use on documents of value and the like.

2. Description of Related Art

A well-known security device is in the form of a surface relief hologram or other similar diffraction optical security device such as a Kinegram, Exelgram etc. which is formed as a hot stamp foil or the like on a carrier and can then be transferred by hot stamping onto the substrate to be secured, such as a banknote. Other embodiments of such security devices include tamper evident holographic labels and holographic threads for banknote applications. There is a continuing need to enhance the security of such devices and U.S. Pat. No. 5,310,222 describes such a device in which an embossed surface relief is de-metallised to form printed images located within a discontinuous metallisation behind the relief.

A further enhancement is described in EP-A-0680411 in which a luminescent material is included in an adhesive layer and/or a transparent layer.

One of the drawbacks with all these approaches is the effect of the underlying substrate onto which the security device is provided. This is particularly because non-security papers used in many security document applications (tickets, tax stamps, etc.) tend to be UV bright and naturally fluoresce strongly so masking the fluorescent feature, for example in EP-A-0680411, which is therefore only useful for UV dull banknote papers. High value security documents are usually based on UV dull papers or substrates ie they do not respond under UV light. These are expensive and for many security applications e.g. labels, substrates such as paper are used but these are optically active and fluoresce strongly under UV light. If a fluorescent material is included in one of the layers of the device, that material fluorescing in response to UV light, a problem arises when the underlying substrate is also sensitive to UV light and also fluoresces brightly. In this situation, the underlying fluorescence can obscure the desired fluorescence from the security device itself. We have attempted to increase the strength of the desired fluorescence by heavily loading the appropriate layer, typically the adhesive, but this is undesirable and can cause problems in coating and adhesion at the weight required.

SUMMARY OF THE INVENTION

In accordance with the present invention, a security device comprises an optically variable effect generating structure; an obscuring layer located, in use, between the optically variable effect generating structure and a substrate to which the device is secured; and a colour layer which exhibits one or more predetermined colors when viewed under certain viewing conditions from the side of the device remote from the obscuring layer and wherein the obscuring layer is substantially opaque at least under the said certain viewing conditions.

We have overcome the problems set out above by including an obscuring layer which is substantially opaque under the said certain viewing conditions. By this we mean that the layer is sufficiently opaque to obscure a conflicting response due to the underlying substrate under the said viewing conditions (for example UV irradiation).

The obscuring layer may also include one or more colors different from the predetermined colour(s) of the colour layer. The effect of this is that when the security device is viewed under the said certain viewing conditions, the predetermined colour(s) of the colour layer will be seen whereas under other viewing conditions the one or more colors of the obscuring layer will be seen. In both cases, these colors will be seen through the optically variable effect. The result is a highly secure device which exhibits different colors when viewed under different viewing conditions and is very hard to counterfeit.

The optically variable effect generating structure can take any conventional form. Typically, the optically variable effect generating structure comprises first and second layers defining a surface relief at their interface. The second layer may comprise one or more layers of relatively high refractive index material such as zinc sulphide, titanium dioxide, and vanadium pentoxide to provide a partially reflective/partially transmissive layer. Alternatively, a discontinuous, fully reflective material such as a partial demetalisation may be provided at the interface, as obtained, for example, from an aluminium layer. This partial demetallised metal (e.g. aluminium) layer can be created using a number of demetallisation processes known in the art. Typically, the first layer will comprise a lacquer with an embossed surface relief while the reflective layer comprises a partially metallised surface or refractory material whilst the additional colour and obscuring layers will comprise of varnish and/or adhesives.

In most cases, we envisage a simple structure in which the optically variable effect generating structure, colour layer and obscuring layer are provided one above the other but it is possible for one or more intermediate layers to be provided.

In the preferred examples, the "certain viewing conditions" correspond to irradiation under UV light with the resultant colour(s) being in the form of fluorescence visible either within the visible wavelength range (for ease of authentication) or invisible to the human eye but detectable outside that range (for example in the infra red for machine reading). However, the material contained by the second layer could instead be responsive to radiation at other wavelengths, for example infrared phosphorescence from visible or invisible markings.

In order to secure the device to a substrate, it is necessary to include an adhesive. This could be provided during the securing step, either by placing the adhesive on the substrate or on the obscuring layer (or a layer joined directly or indirectly to the obscuring layer) but conveniently an adhesive layer is provided as part of the security device. In the most preferred approach, the third layer itself constitutes an adhesive.

Preferably, the obscuring layer is substantially continuous. This has the advantage that the entire underlying surface of the substrate onto which the security device is provided is obscured, at least under said certain viewing conditions. However, we also envisage a discontinuous obscuring layer. In this situation, some effects of the underlying substrate would remain visible through the discontinuous reflective material while those areas of the substrate covered by the obscuring layer would not.

The obscuring layer may comprise a plurality of sections, preferably in the form of stripes which may be abutted beside each other or even overlap to generate a continuous layer. Those sections may have the same or different colors by including one or more pigments in the sections.

The optically variable effect will typically be a hologram but other diffractive effects could also be used such as pure diffraction grating structures, Exelgrams and Kinegrams as known in the art. The optically variable effect itself can generate one or more patterns which may have graphic or pictorial forms or comprise symbols and these may be in the form of a single such representation or multiple representations. Furthermore, the patterns may be visible to the naked eye or only after magnification.

The colour layer may exhibit a simple colour or colors which are visible through the discontinuous reflective material or transparent refractory layer and hence the optically variable effect. In more sophisticated approaches, the colour layer may exhibit one or more patterns when viewed under the appropriate viewing conditions. These patterns could be linked with the substrate on which the security device is provided (for example a symbol or the like which also appears on the substrate) or in the preferred approach relate to the optically variable effect. For example, the patterns generated by the colour layer and the optical variable effect could be the same.

It will be appreciated that typically the optical variable effect will be readily detectable to the naked eye providing a further level of security while the presence of the colour(s) and/or pattern(s) of the colour layer will only be detectable under the certain viewing conditions such as UV irradiation. This therefore provides a second, covert level of authentication. Where the colour layer generates a plurality of substantially identical patterns, these could be visualised with a micro-lens array having similar dimensions as described in more detail in EP-A-0698256 using for example fluorescence to increase feature visibility to the human eye, so aiding verification.

The material incorporated in the colour layer can be chosen from a wide variety of materials which exhibit one or more predetermined colors under the certain viewing conditions. The use of UV or IR radiation has already been mentioned above to stimulate fluorescence or phosphorescence. Other materials sensitive to different energy input forms include thermochromic inks responding to temperature change, photochromic inks responding to selected light wavelength input, optically variable inks, magnetic inks responding to electromagnetic fields, phosphor inks, anti-stokes materials and the like.

It would also be possible to include one or more of these inks in the obscuring layer either alone (if sufficient opaqueness is achieved) or in combination with a further pigment or the like which achieves the substantially opaque nature of the obscuring layer.

The layers can be provided in any conventional method using coating or printing techniques well known to persons of ordinary skill in the art. Examples of typical printing techniques include lithographic, letterpress, intaglio/gravure, flexography, ink jet, dye diffusion and toner deposition.

The security device can be used on a wide variety of substrates but is particularly suitable for documents of value of many different types. Examples include vehicle licences, tax discs, certificates of insurance, and the like. More generally, the invention is applicable to visas, passports, licences, cheques, identity cards, plastic cards, banknotes, tickets, bonds, share certificates, vouchers, passes, permits, electrostatic photocopies, electrostatic laser printed materials, brand authentication labels and other documents and packaging, serial numbering slips, quality control certificates, bills of lading and other shipping documentation, legal documents and tamper evident labels.

BRIEF DESCRIPTION OF THE DRAWINGS

Some examples of security devices according to the invention will now be described with reference to the accompanying drawings, in which.

DETAILED DESCRIPTION OF PREFERRED EMBODIMENTS

Figure 1:
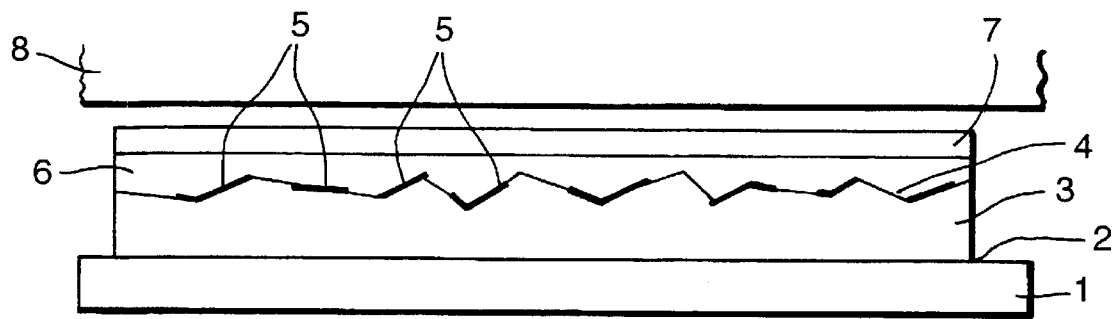
FIG. 1 is a schematic cross-section (not to scale) of a first example.

FIG. 1 illustrates a first example of a security device mounted on a carrier to form a hot stamping foil. The carrier 1 is made of polyester (PET) or the like in a conventional manner and has a surface 2 carrying a wax release layer or the like (not shown). A first layer 3 of the security device is coated onto the carrier 1 to a thickness in the range $1 \propto 5 \, \mu m$, preferably 1–2 $\mu m$ using a gravure cylinder. This layer 3 is in the form of an embossing lacquer which is transparent to all wavelengths to which the security device is to respond. In another embodiment (not shown), the carrier 1 could be made of polypropylene, corona treated to provide some degree of adherence during handling but allowing a release of the other images to form a transfer film.

Either during the coating step or thereafter, the exposed surface of the layer 3 is holographically embossed at 4 to form a surface relief defining a hologram. For example, thermoforming under heat and pressure or in-situ polymerisation replication (ISPR) could be used.

In the case of a label, for example a polypropylene tamper evident label or PET label the emboss could be formed directly in the substrate material, or in an embossing lacquer coated onto a PET carrier in the absence of a release coat to form a label substrate.

The embossed surface 4 is metallised using usually aluminium (or other suitable metal) in a vacuum deposition process as shown at 5 so as to form a continuous metallic layer. A partially metallised layer can then be achieved after continuously coating the surface 4 with metal by selectively etching away metal from the areas which are to be non-metallised to form a discontinuous metallic usually patterned layer. Alternatively a mask could be laid down first to define the areas to be metallised, with the exposed metal etched away to leave a discontinuous metal layer.

As discussed above, instead of a discontinuous metallic layer, the reflective property could be provided by using one or more layers of a refractory material such as zinc sulphide, having a relatively higher refractive index. These layers can define coloured coatings or semi-transparent devices and in the case of a semi-transparent device, the reflective layer would be left continuous and the effect viewed through this layer. Additionally, in the case of refractory semi-transparent layers, the continuous layer could be essentially colourless and transparent or active outside the visual wavelengths, A second or colour layer 6 is then printed onto the partially metallised surface relief 4. In this example, the layer 6 is a varnish or resin incorporating a fluorescent material, i.e. a material which fluoresces in response to UV irradiation, that fluorescence typically being in the visible range.

Finally, a third or obscuring layer 7 is printed onto the layer 6. The layer 7 is an adhesive (typically a heat activated adhesive for standard hot stamping foils, but pressure sensitive adhesives are also possible for example with cold transfer foils or for label applications) which contains a coloured pigment such as a red pigment. As explained above, the constituents of the layer 7 are chosen so that the effect of the underlying substrate to which the security device is applied, in response to irradiation to which materials in the layer 6 respond, is obscured.

In an alternative approach, the layer 7 need not be an adhesive and a further layer could be printed or coated onto the layer 7, that layer constituting the adhesive.

When the security device is to be adhered to a substrate 8 such as a banknote or the like, the hot stamping film is brought adjacent the substrate 8 with the adhesive layer 7 in contact with the substrate. A hot die or roller (not shown) is brought into contact with the exposed surface of the carrier 1 which causes the adhesive layer 7 to be activated so as to adhere the security device to the substrate 8. The carrier 1 can then be peeled away to leave the security device secured to the substrate.

In the case of cold transfer, conventional cold transfer methods could be used.

In all cases, threads may be incorporated into banknote papers and tapes may be rolled on.

In use, when this security device is viewed under normal viewing conditions (white light) the hologram generated by the surface relief 4 and partially metallised areas 5 will be seen while the red pigment in the adhesive layer 7 will be visible through the gaps between the metallisation regions 5.

When the security device is viewed under UV light, this will cause the fluorescent material in the layer 6 to fluoresce green which can be seen through the demetallised areas. In this case, the UV fluorescence is visible in preference to the red pigment in the layer 7. Furthermore, even though the substrate 8 may be "UV bright" and generate a strong response in the presence of UV irradiation, this will not be seen in the region of the security device since it will be obscured by the red pigment in the layer 7.

Of course, other combinations of pigments and luminescent materials could be used. For example, covert machine readable features could be produced by using phosphorescent pigments with known decay times.

As mentioned above, the holographic image which is generated may relate to an image on the substrate 8 and/or to an image generated by the luminescence in the layer 6.

In addition, special inks could be incorporated in the layer 7 such as thermochromic inks and the like and also magnetically detectable inks.

Although the layer 7 has been shown in a continuous form in FIG. 1, it could also be formed in abutting sections, each section including one of two different pigments so as to provide a characteristic pattern.

The layer 6 also need not be continuous but could be printed as a pattern, for example of lines of dots or small symbols or as a design made up of two or more different luminescent, particularly fluorescent, materials such as a material which fluoresces red under UV and another which fluoresces green under UV.

Figure 2:
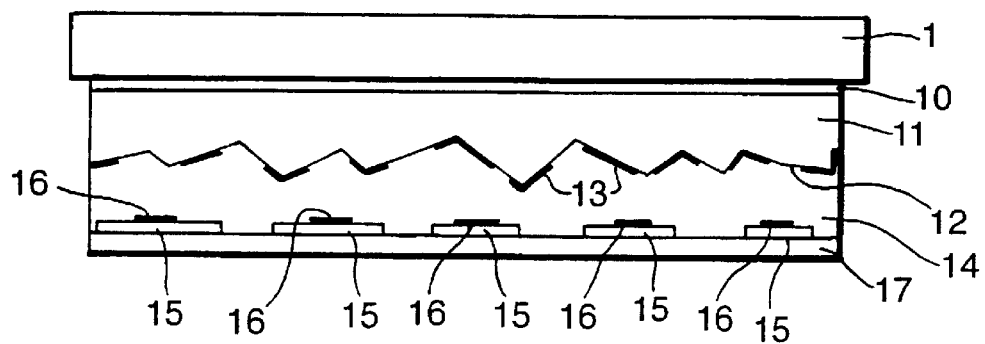
FIG. 2 is a schematic cross-section (not to scale) of a second example.

FIG. 2 illustrates a second example of the security device again provided on a carrier 1. In this case, the security device is releasably attached to the carrier 1 by a wax release layer 10. The device includes a transparent first layer 11 similar to the layer 3 in FIG. 1 which has been embossed with a surface relief 12 which has been metallised and then partially demetallised as shown at 13. A colour layer 14 comprising a resin including a luminescent material has been coated or printed on the surface relief 12 and then a discontinuous opaque layer 15 has been printed on the layer 14. The layer 15 has been provided in the form of a number of discrete areas, each area incorporating a pigment to make the layer opaque, such as a red pigment or the like. Prior to printing the layer 15, further indicia have been printed using black ink or the like as shown at 16 to achieve additional security.

Finally, an adhesive layer 17 is coated or printed. This layer will be transparent so as to allow parts of the underlying substrate to be visible.

What is claimed is:

1. A security device comprising an optically variable effect generating structure; an obscuring layer located, in use, between the optically variable effect generating structure and a substrate to which the device is secured; and a color layer which exhibits one or more predetermined colors when viewed under certain viewing conditions from the side of the device remote from the obscuring layer, and wherein the obscuring layer is substantially opaque under the certain viewing conditions.

2. A device according to claim 1, wherein the optically variable effect generating structure comprises first and second layers defining a surface relief at their interface.

3. A device according to claim 2, wherein the second layer comprises one or more layers of relatively high refractive index material.

4. A device according to claim 2, wherein a discontinuous reflective material is provided at the interface.

5. A device according to claim 2, wherein the second layer is constituted by the color layer.

6. A device according to claim 1, wherein the color layer is located between the optically variable effect generating structure and the obscuring layer.

7. A security device according to claim 1, wherein the obscuring layer comprises an adhesive.

8. A security device according to claim 1, wherein the obscuring layer is substantially continuous.

9. A security device according to claim 1, wherein the obscuring layer comprises a plurality of sections, preferably in the form of stripes.

10. A security device according to claim 8, wherein the sections abut one another.

11. A security device according to claim 1, wherein the obscuring layer includes one or more pigments.

12. A security device according to claim 1, wherein the obscuring layer includes one or more luminescent materials.

13. A security device according to claim 1, wherein the color layer includes one or more luminescent materials of different replay characteristics.

14. A security device according to claim 13, wherein the or each material luminesces under UV illumination.

15. A security device according to claim 1, wherein the optically variable effect is hologram or other diffractive effect.

16. A security device according to claim 1, wherein the optically variable effect comprises one or more patterns.

17. A security device according to claim 1, wherein the color layer exhibits one or more patterns when viewed under said viewing conditions.

18. A security device according to claim 16, wherein the color layer exhibits one or more patterns when viewed under said viewing conditions, and wherein the pattern(s) exhibited by the color layer and the optically variable effect relate to one another.

19. A security device according to claim 18, wherein the pattern(s) and the optically variable effect are substantially the same.

20. A security device according to claim 1, wherein the color layer is discontinuous.

21. A document carrying a security device according to claim 1.

22. A document according to claim 21, the document including a substrate which responds brightly under said viewing conditions.

23. A document of value according to claim 21.

* * * * *